United States Patent
Goike et al.

(10) Patent No.: US 7,146,594 B1
(45) Date of Patent: Dec. 5, 2006

(54) SYSTEM, METHOD, AND COMPUTER PROGRAM PRODUCT FOR SCHEMATIC GENERATION

(75) Inventors: Thomas J. Goike, Shelby Township, MI (US); Jonathan R. Hague, Royal Oak, MI (US)

(73) Assignee: UGS Corp., Plano, TX (US)

( * ) Notice: Subject to any disclaimer, the term of this patent is extended or adjusted under 35 U.S.C. 154(b) by 181 days.

(21) Appl. No.: 10/736,326

(22) Filed: Dec. 15, 2003

(51) Int. Cl.
*G06F 17/50* (2006.01)

(52) U.S. Cl. ............................................. 716/11; 716/1

(58) Field of Classification Search .................... 716/1, 716/8, 11–12; 345/418, 419, 440
See application file for complete search history.

(56) References Cited

U.S. PATENT DOCUMENTS

| | | | | |
|---|---|---|---|---|
| 5,463,563 A * | 10/1995 | Bair et al. ..................... | 716/11 |
| 5,550,714 A | 8/1996 | Nishiyama | |
| 5,694,481 A | 12/1997 | Lam et al. | |
| 6,311,316 B1 * | 10/2001 | Huggins et al. ............... | 716/12 |
| 6,449,762 B1 * | 9/2002 | McElvain ..................... | 716/18 |
| 6,545,673 B1 * | 4/2003 | Shiitani et al. ............. | 345/418 |
| 6,735,742 B1 * | 5/2004 | Hatsch et al. .................. | 716/2 |
| 6,738,957 B1 * | 5/2004 | Gont et al. .................... | 716/11 |
| 6,904,571 B1 * | 6/2005 | Schmidt et al. ................ | 716/2 |
| 6,980,211 B1 * | 12/2005 | Lin et al. .................... | 345/440 |

OTHER PUBLICATIONS

Naveen et al., "An Automactic Netlist-to-Schematic Generator," IEEE, 1993, pp. 36-41.*
Kim et al., "Right Topologizer: An Efficient Schematic Generator for Multi-Level Optimization," IEEE, 2000, pp. 387-391.*
Hutchings et al., "Developing and Debugging FPGA Applications in Hardware with JHDL," IEEE, 1999, pp. 554-558.*

* cited by examiner

*Primary Examiner*—Vuthe Siek (57) ABSTRACT

A method for electrical schematic creation includes loading a schematic definition file, and determining circuit component placement relationships according to the schematic definition file and a component rule set. The method also includes defining a location of a first component of the schematic definition file, and defining locations of a plurality of second components of the schematic definition file in relation to the location of the first component. The method also includes creating a schematic output file corresponding to the circuit component placement relationships and the schematic definition file, so that the schematic output file describes an automatically-generated electrical schematic corresponding to the schematic definition file.

18 Claims, 5 Drawing Sheets

SYSTEM, METHOD, AND COMPUTER PROGRAM PRODUCT FOR SCHEMATIC GENERATION

TECHNICAL FIELD OF THE INVENTION

The present invention is directed, in general, to processes and systems for designing electrical schematics.

BACKGROUND OF THE INVENTION

The current process for generating electrical schematics for service is very manual intensive and time consuming. Engineers routinely work from stacks of printed engineering vehicle wiring diagrams with highlighters and markup pens to determine circuits and then re-create a wiring schematic that is tailored to the needs of the vehicle service technician. Once the paper schematic is redrawn electronically in an illustration tool, it is validated against the as-built vehicle to ensure accuracy and currency with any engineering changes. Though the original math-data is available from engineering with an electrical topology base, it cannot currently be interpreted down to the circuit or component level that is usable for service. Reasons for the disconnect between service and original data include tool translation issues, data model issues, artistic interpretation issues, circuit separation issues, etc.

The current process for schematic generation is inefficient and laborious. In a typical case, engineering first creates a math-based schematic that contains electrical topology and model/option variant information.

Next, in the engineering environment, the same electrical connectivity information is input to a wiring tool for development of the 3D harness model. Each wire/connector required for the harness is 3D validated against the engineering schematic requirements.

Next, in the wiring tool, the same electrical topology information is used to automatically flatten the harness into a manufacturing harness form board.

Next, using the wiring tool, harness suppliers are able to generate hard copy prints that are then distributed to both engineering and service. The harness print is used as the master document for the labor-intensive manual creation of service schematic tailored views.

Next, illustrators then add the appropriate internal circuit information, completing the schematic.

There is, therefore, a need in the art for an improved system, method, and computer program product electrical schematic creation.

SUMMARY OF THE INVENTION

The preferred embodiments provide an improved system, method, and computer program product electrical schematic creation. A circuit specification file is processed to automatically design and produce an electrical schematic.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 4, and the discussion below, and the various embodiments used to describe the principles of the present invention in this patent document are by way of illustration only and should not be construed in any way to limit the scope of the invention. Those skilled in the art will understand that the principles of the present invention may be implemented in any suitably arranged device. The numerous innovative teachings of the present application will be described with particular reference to the presently preferred embodiment.

The preferred embodiments include a system, method, and compute program product for improved schematic generation.

Figure 1:
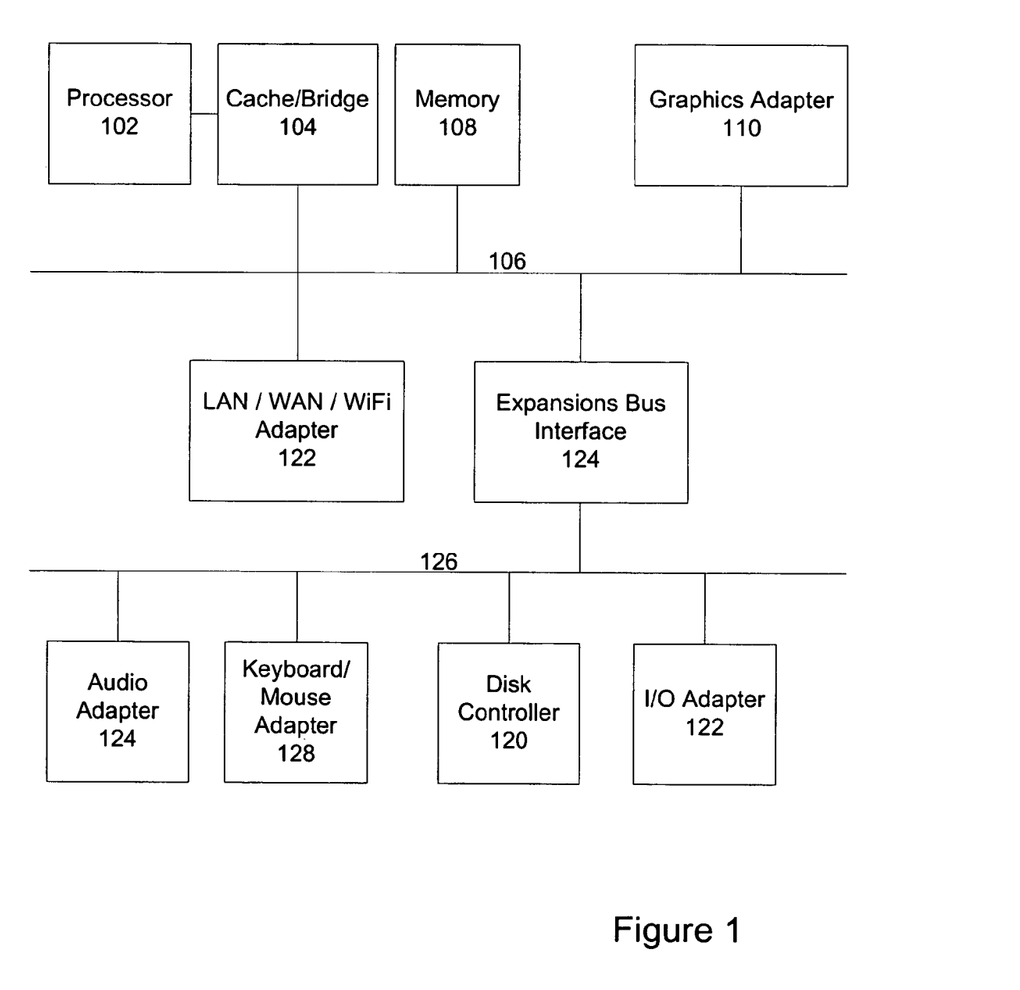
FIG. 1 depicts a block diagram of a data processing system in which various embodiments of the present invention can be implemented.

FIG. 1 depicts a block diagram of a data processing system in which a preferred embodiment can be implemented. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular. For example, other peripheral devices, such as an optical disk drive and the like, also may be used in addition or in place of the hardware depicted. The depicted example is provided for the purpose of explanation only and is not meant to imply architectural limitations with respect to the present invention.

A data processing system in accordance with a preferred embodiment of the present invention includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present invention as described.

The preferred embodiment provides a system, method, and computer program product for reading an entire electrical data file and producing a circuit/component based schematic in tailored views that are usable by the service industry.

Other solutions do not involve the entry into the engineering data stream to utilize the electronic topology data. Instead, the majority of all work is manually derived from full vehicle plots where each circuit must be manually extracted and then redrawn in an illustration tool in the view that is required. Simply creating lines and boxes based on math data will not accurately represent the complex world of the electrical schematic today.

The preferred embodiment, however, below represents two very different, but connected, aspects for data creation. This embodiment directly impacts the creation process through the use of tools and procedures, but more importantly, the data model and object self-awareness builds intelligence into the individual components and allows them to determine where, how and why they should be drawn.

In the disclosed embodiments, individual components have a "spatial-awareness" of where they belong on schematics, relationships to other components for position and movement, relationships to the overall drawing as well as knowledge of other components that may or may not exist on the same schematic.

Some particular features of various embodiments include the ability to auto-place roles (2D and 3D) and parameter settings, a splice modeled as a generic device, automated device alignment, global values for pin spacing, etc., terminals and ports displayed according to an assigned electrical "flow", dynamic generic device architecture (used for multiple symbols), the target wire text displayed with non-wire ports, and the reordering of master device pins for wire alignment.

Further, other features included in some embodiments include auto-connections based on spatial relationships of components, automated X-adjustment for wires that lead to doubleout conditions, automated component grouping based on electrical topology, automatic mating of ports for tailored circuit-based views, and automated net path definition.

Two particular features of the preferred embodiments, that are not known to exist in the art, are 2D/3D auto-placement capabilities and dynamic components. Known schematic generation techniques first attempt to place the components and then connect them. In the preferred embodiments, by contract, the type of connection and type of component drive the placement and the resulting tailored view.

Dynamic parametrically modeled schematic symbols: Traditional schematic building involves the use of massive "symbol libraries", containing of a symbol image file for every configuration of every component that may appear on a schematic. The preferred embodiments eliminate the need to maintain such a library by completely eliminating the image files and just using a small set of symbol files consisting of executable code. This code dynamically builds the desired symbol according to parameters that define the symbol's characteristics such as height, how many pins should be displayed, or which style the symbol should have.

These parameters are editable by the user with "stylers," using a graphical user interface, to allow modifications to be made to a completed schematic, or to display it in an alternate style.

Auto-placement of symbols and components: The auto-placement capability of the disclosed embodiments is an important feature for the automated generation of schematics.

There is a fundamental problem when creating any schematic view of increasingly complex topology, whether manually or automatically: How do you place all the various symbols on the page in an orderly, clearly understandable view, with a minimum of crossed wires and overlapping components? This challenge must be addressed in both the original view and when a user edits the view, such as to move a branch of the schematic up to make room for additional text.

This problem is addressed in the disclosed process by automatically assigning each component an "auto-place role". There are four possible roles for a component—MASTER, SLAVE DOWN, SLAVE UP, and NO REF. A component's role is determined by the component type and by its position in the net path relative to other components.

Figure 2A:
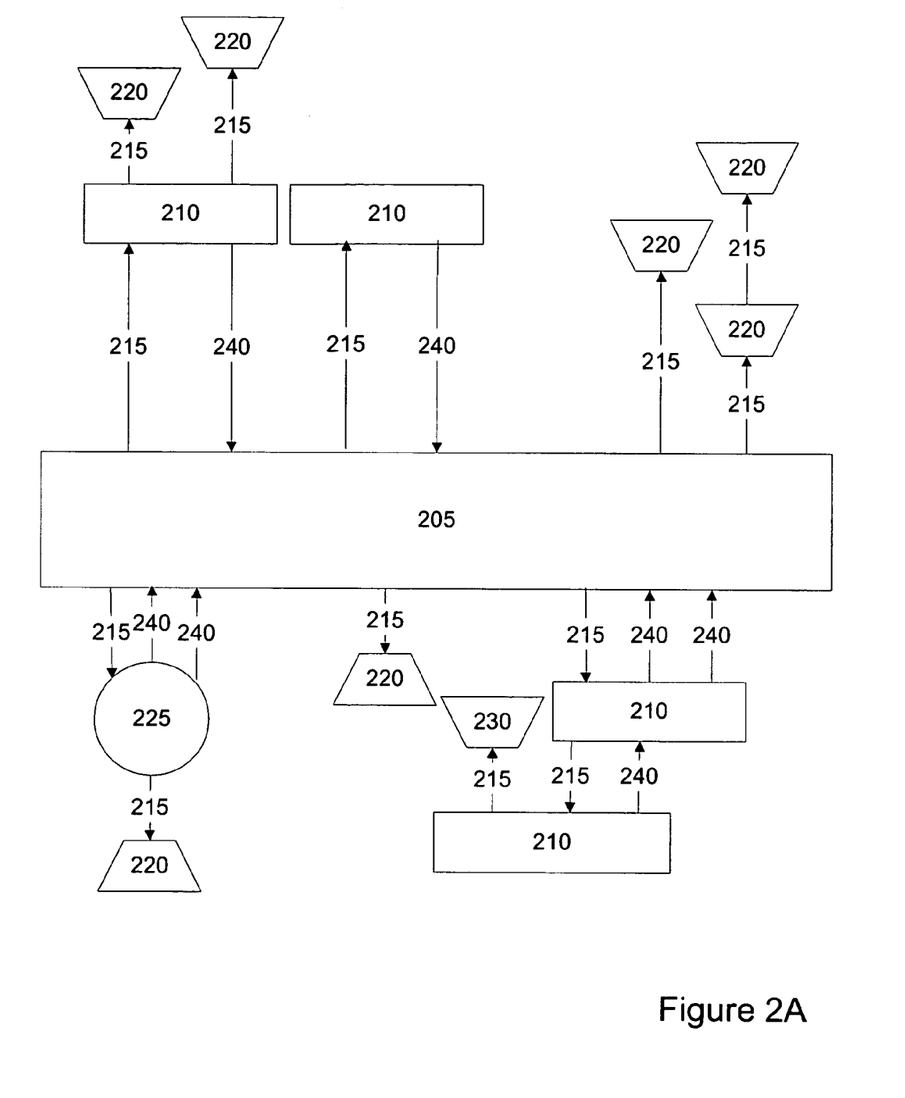
FIGS. 2A and 2B depict placements of schematic components, in accordance with various embodiments of the present invention.

FIG. 2A depicts an exemplary placement of schematic components, using the defined auto-place roles. Note that the components shown in this figure are generic, using generic shapes, and represent any exemplary components with the illustrated connections. The connection rules of any component are loaded or defined during the generation process.

MASTER role—The device in a group with the most pins, or the top component in a group that does not include a device. This device 205 will serve to locate all other components in the group, and will act as a "handle" for moving the group.

All other components 210/220/225 connected to generic master component 205 are connected in relation to the master component. The master device 205, which is typically defined to have variable pin spacing, is placed first, and other devices are placed in relation to it as connections require. When a master device is placed, all other connected components (with the exception of NO REF components), moving outward from the master device, are direct or indirect slaves to the master device.

SLAVE DOWN role—A component of any type that will be located relative to the component above it in the net, as component 225 is located below master device 205. One input pin on this component will be parametrically aligned with the component above it, eventually leading to the corresponding output pin on the device above it. A SLAVE DOWN component will move when the component above it is moved. In this example, all components located below the master device 205 are in the SLAVE DOWN role, as their placement is dependent on the placement of each component above them, leading to the master device 205.

In FIG. 2, connections 215 are shown as arrows. Here, the base of the arrow represents the "anchor" of the connection, and the point of the arrow represents the slave component that is positioned in reference to the anchor base of the arrow. A connection 215 can be any known connector, such as a wire, a printed circuit board electrical path, or others. Connection paths are defined according to rules that take pin directions and locations into account. Note that in the case of a wire, the wire itself can be treated as a separate component that follows the same placement rules described for other components.

When multiple connections between two components are made, as the connection between component 225 and master device 205, the first connection is made from an anchor on the master component, thereby positioning the slave component 225. Then, additional connections 240 are extended from the slave component, now positioned relative to its master component. These additional connections do not affect the placement of the components.

SLAVE UP role—A component of any type that will be located relative to the component below it in the net. One output pin on this component will be parametrically aligned with the component below it, eventually leading to the corresponding input pin on the device below it. In addition, component 230 is also in a SLAVE UP role. A SLAVE UP component will move when the component below it is moved. In FIG. 2A, all components shown above master device 205 are in the SLAVE UP role with relation to the component below them, leading to the master device 205. Note that multiple components can be linked in a chain, each in a master-slave positional relationship with another component, and that the chain can diverge and rejoin in accordance with the topology described in the client source data.

Figure 2B:
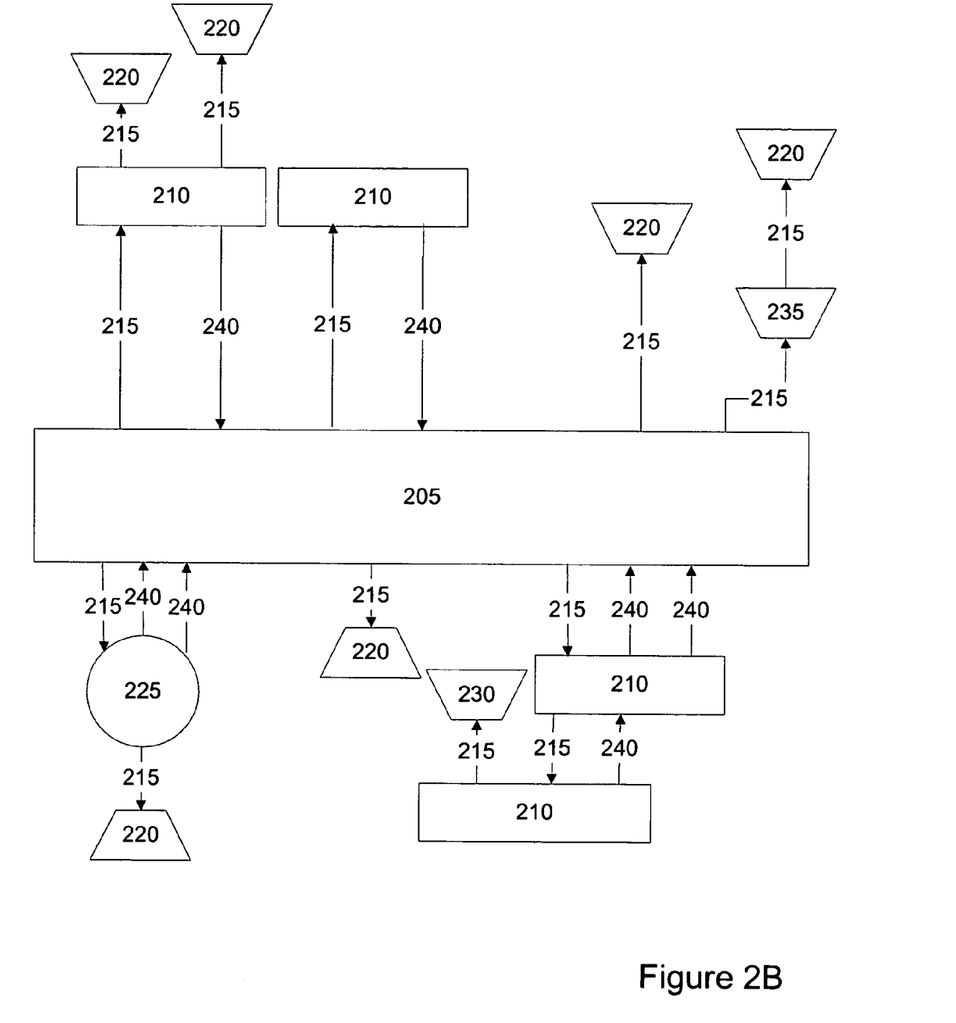

FIG. 2B, which corresponds to FIG. 2A, illustrates the behavior of components in a SLAVE UP relationship during an edit. In this case component 235 (corresponding to component 220 in FIG. 2A) is moved to the right. The SLAVE UP component above it moves along with it, and the connection between component 235 and its master adjusts to maintain the connectivity of the component pins. Note that the exact inverse of this behavior occurs in a SLAVE DOWN scenario.

NO REF role—A component (other than a MASTER component) that is not located relative to another component. NO REF components are placed at arbitrary locations and located manually by the user. A NO REF component will not move when connected components are moved. A NO REF role is only assigned to a component in the relatively rare circumstance where any of the other roles would create a conflict due to a circular reference.

2D/3D placement of components: Electrical schematics have traditionally been a two-dimensional concept. The preferred embodiments provide a conventional 2D view and also have the capability of morphing that view into a three-dimensional schematic view, where electrical components are displayed in their actual 3D product position.

Figure 3:
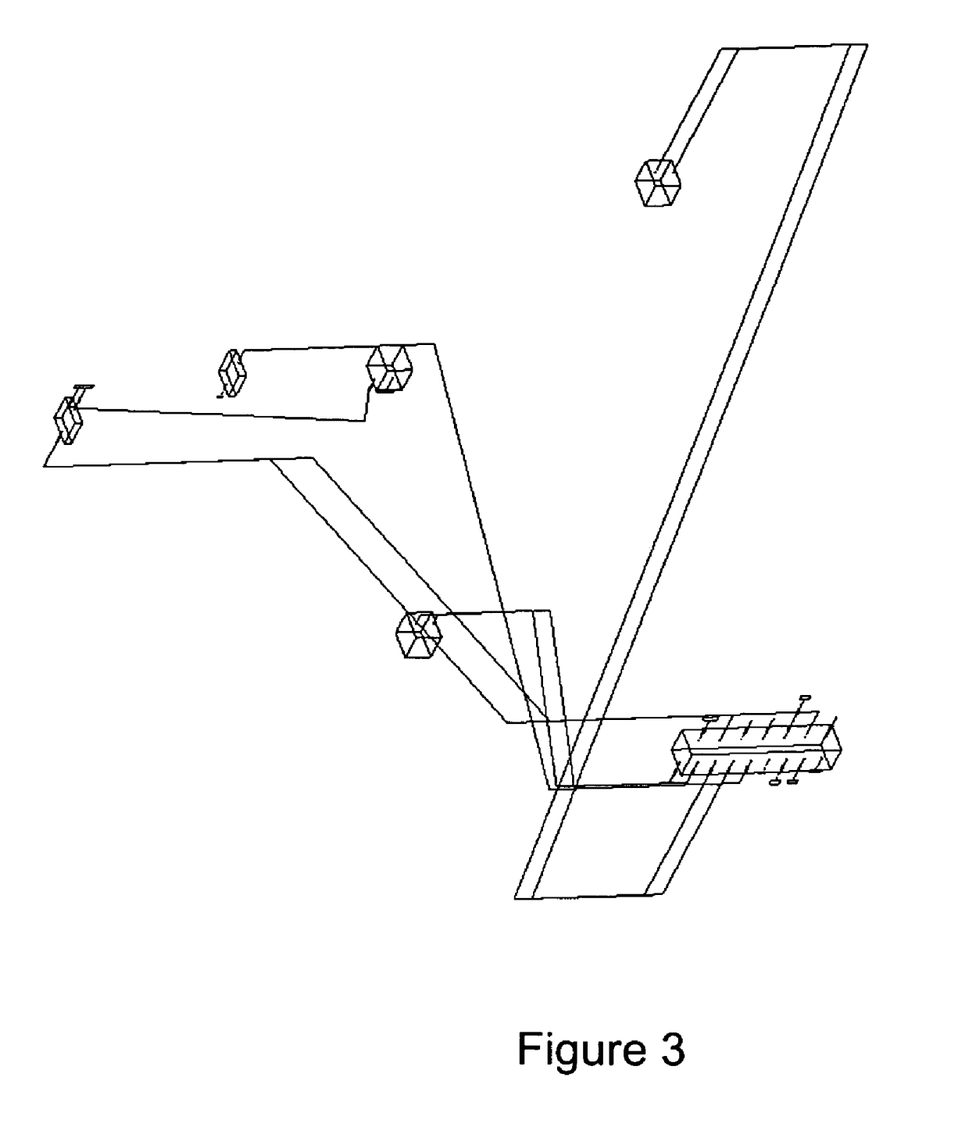
FIG. 3 depicts an exemplary illustration of a three-dimensional schematic view.

Each component can have a 2D and a 3D coordinate assigned. The 2D coordinate is calculated with the auto-placement methodology, and the 3D coordinate is retrieved from an external source, typically the system used for product design. FIG. 3 depicts an exemplary illustration of a three-dimensional schematic view.

Figure 4:
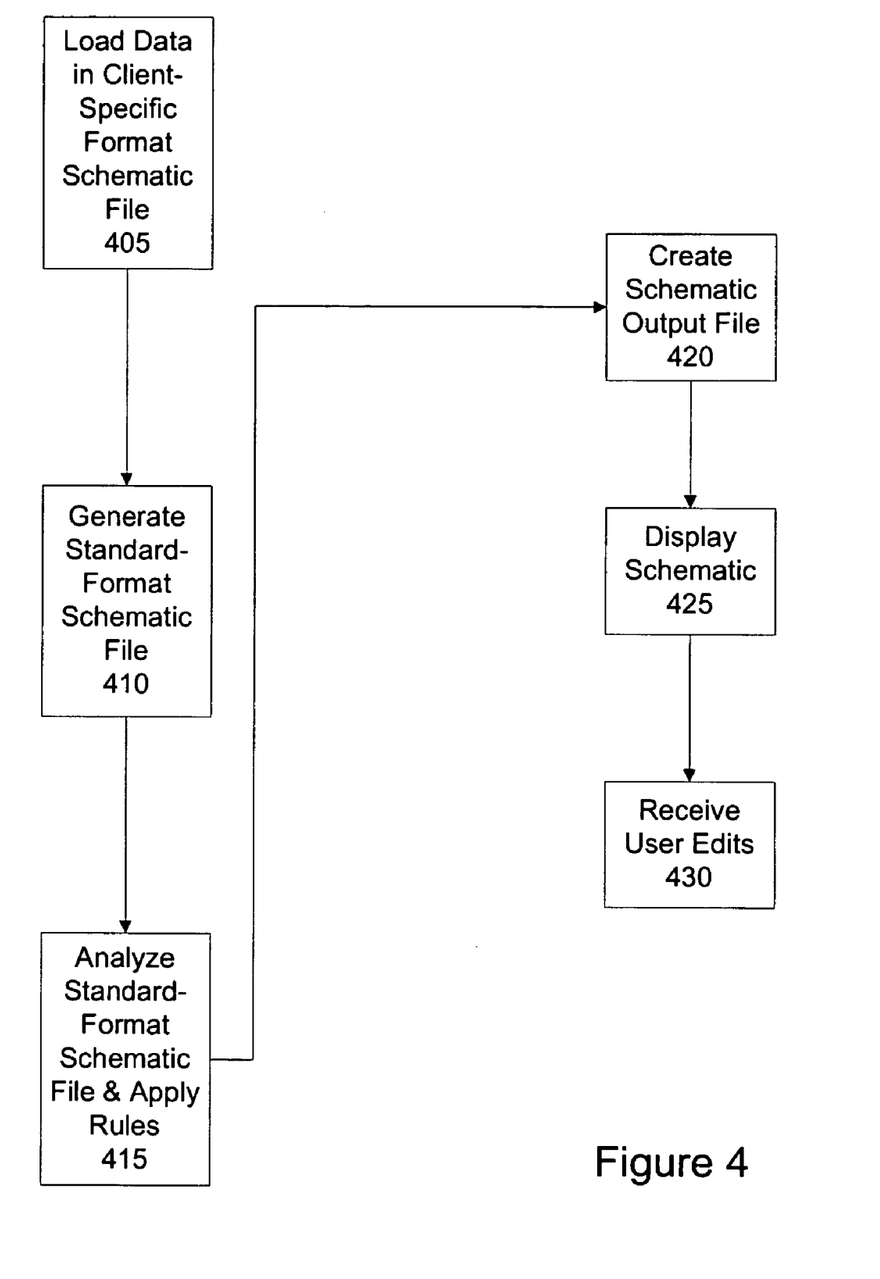
FIG. 4 depicts a flowchart of a process in accordance with an embodiment of the present invention.

FIG. 4 depicts a flowchart of a process in accordance with an embodiment of the present invention. First, the client source data, describing the circuit requirements, is loaded in the data processing system (step 405). This file will typically be in a client-specific format.

Next, the system generates a standard-format schematic definition file from the client-specific format (step 410). In this step, the data processing system executes a script to generate or update a standard format schematic file from the client source data. This step allows the generation process to be applied to a wide range of circuit-requirement definition formats. The resulting file provides a standard-form definition of circuit component characteristics and required connections. Of course, if the client data is received in a standardized form this step can be omitted.

Next, the system analyzes the standard format schematic file in accordance with a set of component rules to determine placement relationships of each component (step 415). The rules here can include display characteristics, component dimensions and shapes, the input/output requirements of each component, a definition of which pin on the component defines its location, any positional requirements with relation to other components, etc.

The system then produces a schematic output file (step 420). The schematic output file describes the appearance, location, and behavior of each component.

Next, the system can optionally display a finished circuit schematic corresponding to the schematic output file (step 425).

Next, if necessary or desired, the system can receive user edits of the schematic (step 430). If the auto placement of components is not optimal the system maintains associated "stylers" that can be used to move components or change specific attributes. The system optionally receives edits through the stylers interface.

Those skilled in the art will recognize that, for simplicity and clarity, the full structure and operation of all data processing systems suitable for use with the present invention is not being depicted or described herein. Instead, only so much of a data processing system as is unique to the present invention or necessary for an understanding of the present invention is depicted and described. The remainder of the construction and operation of data processing system 100 may conform to any of the various current implementations and practices known in the art.

It is important to note that while the present invention has been described in the context of a fully functional system, those skilled in the art will appreciate that at least portions of the mechanism of the present invention are capable of being distributed in the form of a instructions contained within a machine usable medium in any of a variety of forms, and that the present invention applies equally regardless of the particular type of instruction or signal bearing medium utilized to actually carry out the distribution. Examples of machine usable mediums include: nonvolatile, hard-coded type mediums such as read only memories (ROMs) or erasable, electrically programmable read only memories (EEPROMs), user-recordable type mediums such as floppy disks, hard disk drives and compact disk read only memories (CD-ROMs) or digital versatile disks (DVDs), and transmission type mediums such as digital and analog communication links.

Although an exemplary embodiment of the present invention has been described in detail, those skilled in the art will understand that various changes, substitutions, variations, and improvements of the invention disclosed herein may be made without departing from the spirit and scope of the invention in its broadest form.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC §112 unless the exact words "means for" are followed by a participle.

What is claimed is:

1. A method for generating an electrical schematic, comprising:
    loading a circuit-requirements file, the circuit-requirements file being in a first format, and generating a corresponding schematic definition file, the schematic definition file being in a second format;
    loading the schematic definition file;
    determining circuit component placement relationships according to the schematic definition file and a component rule set;
    creating a schematic output file corresponding to the circuit component placement relationships and the schematic definition file, wherein the schematic output file describes an automatically-generated electrical schematic corresponding to the schematic definition file.

2. A method for generating an electrical schematic, comprising:
    loading a schematic definition file;
    determining circuit component placement relationships according to the schematic definition file and a component rule set;
    defining a location of a first component of the schematic definition file, and defining locations of a plurality of second components of the schematic definition file in relation to the location of the first component; and
    creating a schematic output file corresponding to the circuit component placement relationships and the schematic definition file, wherein the schematic output file describes an automatically-generated electrical schematic corresponding to the schematic definition file.

3. A method for generating an electrical schematic, comprising:
    loading a schematic definition file;
    determining circuit component placement relationships according to the schematic definition file and a component rule set;
    creating a schematic output file corresponding to the circuit component placement relationships and the schematic definition file, wherein the schematic output file describes an automatically-generated electrical schematic corresponding to the schematic definition file; and
    displaying a three-dimensional image, corresponding to the automatically-generated electrical schematic, showing the relative three-dimensional location of multiple circuit components.

4. A method for generating an electrical schematic, comprising:
    loading a schematic definition file;
    determining circuit component placement relationships according to the schematic definition file and a component rule set;
    creating a schematic output file corresponding to the circuit component placement relationships and the schematic definition file, wherein the schematic output file describes an automatically-generated electrical schematic corresponding to the schematic definition file, wherein the schematic output file includes both two-dimensional and three-dimensional location data for a plurality of electrical components.

5. The method of claim 4, further comprising displaying an electrical schematic corresponding to the schematic output file.

6. The method of claim 4, further comprising receiving user edits of the automatically-generated electrical schematic.

7. A data processing system having at least a processor and accessible memory, comprising:
    means for loading a schematic definition file;
    means for determining circuit component placement relationships according to the schematic definition file and a component rule set;
    means for creating a schematic output file corresponding to the circuit component placement relationships and the schematic definition file, wherein the schematic output file describes an automatically-generated electrical schematic corresponding to the schematic definition file, wherein the schematic output file includes both two-dimensional and three-dimensional location data for a plurality of electrical components.

8. The data processing system of claim 7, further comprising means for loading a circuit-requirements file, the circuit-requirements file being in a first format, and means for generating a corresponding schematic definition file, the schematic definition file being in a second format.

9. The data processing system of claim 7, further comprising means for displaying an electrical schematic corresponding to the schematic output file.

10. The data processing system of claim 7, further comprising means for receiving user edits of the automatically-generated electrical schematic.

11. The data processing system of claim 7, further comprising means for defining a location of a first component of the schematic definition file, and means for defining locations of a plurality of second components of the schematic definition file in relation to the location of the first component.

12. The data processing system of claim 7, further comprising means for displaying a three-dimensional image, corresponding to the automatically-generated electrical schematic, showing the relative three-dimensional location of multiple circuit components.

13. A computer program product tangibly embodied in a machine-readable medium, comprising:
   instructions for loading a schematic definition file;
   instructions for determining circuit component placement relationships according to the schematic definition file and a component rule set;
   instructions for creating a schematic output file corresponding to the circuit component placement relationships and the schematic definition file, wherein the schematic output file describes an automatically-generated electrical schematic corresponding to the schematic definition file, wherein the schematic output file includes both two-dimensional and three-dimensional location data for a plurality of electrical components.

14. The computer program product of claim 13, further comprising instructions for loading a circuit-requirements file, the circuit-requirements file being in a first format, and instructions for generating a corresponding schematic definition file, the schematic definition file being in a second format.

15. The computer program product of claim 13, further comprising instructions for displaying an electrical schematic corresponding to the schematic output file.

16. The computer program product of claim 13, further comprising instructions for receiving user edits of the automatically-generated electrical schematic.

17. The computer program product of claim 13, further comprising instructions for defining a location of a first component of the schematic definition file, and instructions for defining locations of a plurality of second components of the schematic definition file in relation to the location of the first component.

18. The computer program product of claim 13, further comprising instructions for displaying a three-dimensional image, corresponding to the automatically-generated electrical schematic, showing the relative three-dimensional location of multiple circuit components.

* * * * *